United States Patent
Wakabayashi

(10) Patent No.: US 7,377,434 B2
(45) Date of Patent: May 27, 2008

(54) MAGNETIC CARD PROCESSOR WITH IMPROVED FRAUD RESISTANCE

(75) Inventor: Naoyuki Wakabayashi, Osaka (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 11/607,996

(22) Filed: Dec. 4, 2006

(65) Prior Publication Data
US 2007/0131768 A1 Jun. 14, 2007

(30) Foreign Application Priority Data
Dec. 14, 2005 (JP) ............... 2005-360888

(51) Int. Cl.
*G06K 7/08* (2006.01)
(52) U.S. Cl. ..................... 235/449; 235/450
(58) Field of Classification Search ............... 235/475, 235/449, 450
See application file for complete search history.

(56) References Cited

U.S. PATENT DOCUMENTS

| | | | |
|---|---|---|---|
| 6,367,695 B1* | 4/2002 | Mair et al. | 235/380 |
| 6,390,367 B1* | 5/2002 | Doig | 235/436 |
| 6,422,475 B1* | 7/2002 | May | 235/492 |
| 7,240,827 B2* | 7/2007 | Ramachandran et al. | 235/379 |
| 2004/0026507 A1 | 2/2004 | Nagata | |

FOREIGN PATENT DOCUMENTS

| EP | 1 422 654 | 5/2004 |
|---|---|---|
| JP | 2001-067524 | 3/2001 |

OTHER PUBLICATIONS

Svigals, J., "Unauthorized Card Stripe Reading Inhibitor", IBM Technical Disclosure Bulletin, IBM Corp., New York, USA vol. 26, No. 6, Nov. 1, 1983.

* cited by examiner

*Primary Examiner*—Tu T. Nguyen
*Assistant Examiner*—Rafferty Kelly
(74) *Attorney, Agent, or Firm*—Antonelli, Terry, Stout & Kraus, LLP.

(57) ABSTRACT

A card processor which can substantially reliably prevent magnetic data recorded in a magnetic card and can remarkably enhance security. In the card processor, two radiation sources radiate disturbing magnetic fields outside of an insertion slot. A disturbing magnetic field radiated from one radiation source and a disturbing magnetic field radiated from the other radiation source have different frequencies and intensities. Accordingly, even when a differential head is located at such a position as to be influenced by the disturbing magnetic fields, it is substantially impossible to attain such balance adjustment as to eliminate the influences of the disturbing magnetic fields.

10 Claims, 8 Drawing Sheets

CARD INSERTING DIRECTION

MAGNETIC CARD PROCESSOR WITH IMPROVED FRAUD RESISTANCE

INCORPORATION BY REFERENCE

This application claims the benefit of priority of Japanese Application No. 2005-360888 filed Dec. 14, 2005, the disclosure of which also is entirely incorporated herein by reference.

BACKGROUND OF THE INVENTION

The present invention relates to a card processor for reading magnetic data recorded in a magnetic card and to data processing device built in the card processor.

Conventionally, a card processor for reading magnetic data recorded in a magnetic card is used in such a transaction processing machine as an ATM (Automatic teller machine), CD (Card Dispenser), or CAT (Credit Authorization Terminal). In such a transaction processing machine, the card processor performs data processing operation on money drawing/depositing or credit transaction with use of data read out from a magnetic card. The card processor is used not only in the aforementioned transaction processing machine but also in an entering/leaving room management system for limiting users who enter or leave an area or room as a management target. That is, the card processor is used in various types of machines and systems.

Such crimes that illegally read magnetic data recorded in a magnetic card therefrom and illegally transact using a faked card having the stole magnetic data recorded therein, are recently increasing. In the stealing of the magnetic data, in general, a device called a skimming device is used. From the security viewpoint, the skimming device will be explained herein not in detail but merely briefly. The skimming device, which has a magnetic head for reading out magnetic data recorded in a magnetic card therefrom, is illegally mounted on the front side of a magnetic-card insertion slot in the card processor. In the skimming device, an opening is provided to communicate with the card insertion slot of the card processor. In the card processor having the skimming device mounted therein, a user (an authorized user for the magnetic card) inserts the card into the opening of the skimming device. Accordingly, the magnetic card is inserted from the card insertion slot through the skimming device into the interior of the card processor. The skimming device then illegally reads (steals) magnetic data recorded in the magnetic card therefrom. Even when the magnetic card inserted in the device is returned to the user, the magnetic card is again passed through the skimming device. Thus even at this time, the skimming device can illegally reads the magnetic data recorded in the magnetic card therefrom.

Since the user, who inserted the magnetic card in the card processor, does not know the fact that the skimming device is illegally mounted, the user also does not know the fact that the magnetic data was illegally read or stolen.

An example of the card processors having an arrangement for preventing the aforementioned skimming device from stealing magnetic data is shown in JP-A-2001-67524. In the card processor shown in JP-A-2001-67524 is arranged so that a disturbing magnetic field generator having an iron core wound thereon by a coil is provided in the vicinity of a magnetic card insertion slot to generate a magnetic field (disturbing magnetic field) outside of the insertion slot. The disturbing magnetic field is generated in a range where a magnetic stripe of the magnetic card inserted in the insertion slot passes. Accordingly, even when the skimming device is mounted on the front side of the insertion slot, a read-out signal read out from the magnetic card by the skimming device is superimposed on noise caused by the disturbing magnetic field. As a result, the stealing of the magnetic data by the skimming device can be prevented.

SUMMARY OF THE INVENTION

However, the arrangement of JP-A-2001-67524 is insufficient in a measure against the stealing of the magnetic data by the skimming device. More specifically, when a magnetic head generally called a differential head is used as the magnetic head of the skimming device, there is a high risk that the magnetic data of the magnetic card are stolen. From this viewpoint, a measure against the stealing of the magnetic data is insufficient. The differential head used herein refers to two magnetic heads (read head and a dummy head) having nearly the same electric characteristic accommodated in a single casing. The dummy head is disposed in the vanity of the read head. The read head is brought into contact with the magnetic stripe of the magnetic card to read the magnetic data. The dummy head is disposed at such a position that the dummy head does not come into contact with the magnetic stripe of the magnetic card (or at such a position as not to be influenced by the magnetic data. When the magnetic data of the magnetic card is read out by the differential head, the read-out signal as the output of the read head corresponds to a superimposition of an electromotive force based on the magnetic data and an electromotive force based on a peripheral magnetic field (external magnetic field); whereas, the output of the dummy head is a signal of an electromotive force based on the peripheral magnetic field (external magnetic field). Thus by finding a difference between the output of the read head and the output of the dummy head, a read-out signal for the magnetic data not influenced by the external magnetic field or disturbing magnetic field.

As a practical matter, the electric characteristic of the read head is not completely equal to the electric characteristic of the dummy head due to variations among parts used therefore. Further, it is physically impossible to locate the read head and the dummy head at the same position. For this reason, the read head and the dummy head have different external magnetic fields. Thus even when a difference between the output of the read head and the output of the dummy head is merely found, it is impossible to obtain a read-out signal for the magnetic data not influenced by the external magnetic field. To avoid this, when the differential head is generally used, a balance adjusting circuit including an amplifier for amplifying at least one of the outputs of the read and dummy heads and including a gain adjusting circuit for adjusting the gain of the amplifier is provided. The gain of the amplifier is adjusted so that, in such a state that the read head does not read the magnetic data yet, a difference output between the output of the read head and the output of the dummy head becomes zero. As a result, the magnetic data can be read while not influenced by the external magnetic field.

Thus a measure in the card processor disclosed in JP-A-2001-67524 has a problem that, when the aforementioned differential head is used in the skimming device, the magnetic data is stolen.

It is therefore an object of the present invention to provide a card processor which can substantially reliably prevent magnetic data recorded in a magnetic card from being stolen and can remarkably enhance security, and also a data processing device having the card processor built therein.

In accordance with aspects of the present invention, the above object is obtained by providing card processors having arrangements (1) to (13) which follow.

(1) The card processor includes a magnetic data reader for reading magnetic data recorded in a magnetic card transferred along a card transfer path with use of a magnetic head provided in the midway of the transfer path; and a magnetic field generator for generating a magnetic field outside of an insertion slot of the transfer path, wherein the magnetic field generator has a plurality of radiation sources for radiating the magnetic field outside of the insertion slot of the transfer path and a plurality of drive sources provided for respective radiation sources, and two specific drive sources in the plurality of drive sources have different frequencies of drive signals for driving the radiation sources.

In this arrangement, a combined magnetic field of the magnetic fields radiated from the plurality of radiation sources is generated outside of the insertion slot. Magnetic fields (disturbing magnetic fields) radiated from the 2 specific radiation sources in the plurality of radiation sources have different frequencies. In other words, the disturbing magnetic fields radiated from the plurality of radiation sources have 2 or more types of frequencies. For this reason, even when a skimming device using a differential head outside of the insertion slot is illegally mounted, it is impossible to perform balance adjustment of the differential head of the skimming device. This is because, even when suitable balance adjustment is carried out on one magnetic field radiated from one radiation source, unsuitable balance adjustment is carried out on another magnetic field radiated from another radiation source. This means that noise caused by the magnetic field (disturbing magnetic field) generated by the magnetic field generator is superimposed on a read signal for the magnetic data in the skimming device. Thus even the skimming device using the differential head can be substantially reliably prevented from stealing the magnetic data from the magnetic card.

(2) The card processor includes a magnetic data reader for reading magnetic data recorded in a magnetic card transferred along a card transfer path with use of a magnetic head provided in the midway of the transfer path; and a magnetic field generator for generating a magnetic field outside of an insertion slot of the transfer path, wherein the magnetic field generator has a plurality of radiation sources for radiating the magnetic field outside of the insertion slot of the transfer path and a plurality of drive sources provided for respective radiation sources, and two specific drive sources in the plurality of drive sources use drive signals which drive the radiation sources and have time-different amplitude ratios.

In this arrangement, as in the above arrangement (1), a combined magnetic field of the magnetic fields radiated from the plurality of radiation sources is generated outside of the insertion slot. Magnetic fields (disturbing magnetic field) radiated from at least 2 specific radiation sources in the plurality of radiation sources have time-different intensity ratios. For this reason, even when the skimming device using the differential head provided outside of the insertion slot is illegally mounted, the differential head of the skimming device cannot perform balance adjustment. This is, as in the above arrangement (1), because suitable balance adjustment is carried out on a magnetic field radiated from one radiation source but unsuitable balance adjustment is carried out on a magnetic field radiated from another radiation source. Thus noise caused by the magnetic field (disturbing magnetic field) generated by the magnetic field generator is superimposed on a read signal for the magnetic data in the skimming device. As a result, even the skimming device using the differential head can be substantially reliably prevented from stealing the magnetic data from the magnetic card.

The drive signals have time-different amplitude ratios when the 2 drive signals have different frequencies, when the 2 drive signals have different phases, and when the 2 drive signals have different phases and different amplitudes.

(3) The magnetic field generator functions to switch between drive and stoppage of each of the drive sources at predetermined timing.

In this arrangement, since the disturbing magnetic field generated outside of the insertion slot can be made to vary with time, the magnetic data can be more reliably prevented from being stolen from the magnetic card.

The time interval of switching the drive and stoppage of each radiation source is preferably set to vary at intervals of about one tenths to about a fraction of a time duration necessary for reading the magnetic data recorded in the magnetic card. When the time interval is set to be as short as about tens of ms to hundreds of ms, the balance adjustment of the differential head of the skimming device cannot be practically achieved.

(4) The magnetic field generator functions to vary the amplitude of the drive signal of the radiation source for driving each of the drive sources at predetermined timing.

In this arrangement, as in the above arrangement (3), since the disturbing magnetic field generated outside of the insertion slot can be set to vary with time, the magnetic data can be more reliably prevented from being stolen from the magnetic card.

(5) The card processor includes a magnetic data reader for reading magnetic data recorded in a magnetic card transferred along a card transfer path with use of a magnetic head provided in the midway of the transfer path; and a magnetic field generator for generating a magnetic field outside of an insertion slot of the transfer path, wherein the magnetic field generator has a plurality of radiation sources for radiating the magnetic field outside of the insertion slot of the transfer path and a plurality of drive sources provided for respective radiation sources, and a specific drive source in the plurality of drive sources causes the corresponding radiation source to vary the magnetic field radiated outside of the insertion slot of the transfer path with time.

In this arrangement, a combined magnetic field of the magnetic fields radiated from the plurality of radiation sources is generated outside of the insertion slot. Further, the magnetic field radiated from the specific radiation source is made to vary with time. In other words, the magnetic fields radiated from one or more radiation sources are made to vary with time. Thus the magnetic field (disturbing magnetic field) generated outside of the insertion slot is changed with time by the magnetic field generator. Therefore, even in this case, illegal mounting of the skimming device using the differential head outside of the insertion slot results in that the differential head of the skimming device cannot perform balance adjustment. As a result, the magnetic data can be substantially reliably prevented from being stolen from the magnetic card.

In this connection, it is only required to set a time for changing the magnetic field radiated from the specific radiation source to be about one tenths to about a fraction of a time necessary for reading the magnetic data recorded in the magnetic card or to be as short as about tens of ms to about hundreds of ms.

(6) The specific drive source sweeps the frequency of the drive signal for driving the radiation source to cause the corresponding radiation source to change, with time, the magnetic field radiated outside of the insertion slot of the transfer path.

In this arrangement, the frequency of the drive signal for driving the radiation source is scanned or swept to change, with time, the magnetic field (disturbing magnetic field) generated outside of the insertion slot by the magnetic field generator.

(7) The specific drive source is made to change the frequency of the drive signal for driving the radiation source continuously or intermittently with time to change, with time, the magnetic field radiated outside of the insertion slot of the transfer path by the corresponding radiation source.

In this arrangement, the frequency of the drive signal for driving the radiation source is changed continuously or intermittently with time to change, with time, the magnetic field (disturbing magnetic field) generated outside of the insertion slot by the magnetic field generator.

(8) The card processor includes a magnetic data reader for reading magnetic data recorded in a magnetic card transferred along a card transfer path with use of a magnetic head provided in the midway of the transfer path; and a magnetic field generator for generating a magnetic field outside of an insertion slot of the transfer path, wherein the magnetic field generator has a plurality of radiation sources for radiating the magnetic field outside of the insertion slot of the transfer path, a plurality of drive sources provided for respective radiation sources, and a switch for switching between the radiation sources driven by the drive sources.

In this arrangement, since the radiation sources driven by the drive sources are switched over with time, the disturbing magnetic field generated outside of the insertion slot can be made to vary with time. Thus noise caused by the disturbing magnetic field generated by the magnetic field generator is superimposed on the read signal for the magnetic data in the skimming device. As a result, even when the skimming device uses the differential head, the magnetic data can be substantially reliably prevented from being stolen from the magnetic card.

As has been mentioned above, it is only required to set the switching timing of the switch between the radiation sources driven by the drive sources to be from about one tenths to about a fraction of a time necessary for reading the magnetic data recorded in the magnetic card, or to be as short as about tens of ms to about hundreds of ms.

(9) The drive source functions to change the frequency of the drive signal for driving the radiation source at predetermined timing.

In this arrangement, since even the frequency of the drive source is changed, the magnetic data can be more reliably prevented from being stolen from the magnetic card.

(10) The drive source changes the frequency of the drive signal for driving the radiation sources at the timing when the switching unit switches between the radiation sources.

In this arrangement, the frequencies of the drive signal for driving the radiation source is changed in synchronism with the timing of switching the radiation sources driven by the drive sources.

(11) The card processor further includes a suppressor for suppressing the influences of the magnetic field generated by the magnetic field generator on the magnetic head of the magnetic data reader.

In this arrangement, the magnetic data can be read out from the magnetic card with use of the magnetic head while avoiding the influence of the disturbing magnetic field generated by the magnetic field generator.

Data processing devices in accordance with aspects of the present invention have arrangements (12) and (13) which follow.

(12) The data processing device incorporates the card processor set forth in any of the arrangements (1) to (11), and includes a processing unit for processing the magnetic data read out from the magnetic card by the magnetic data reader of the card processor.

In this arrangement, there can be provided a data processing device such as an ATM, a CD or CAT which can be substantially reliably prevent the magnetic data from being stolen from the magnetic card.

(13) The data processing device includes a detector for detecting the presence or absence of a user, and an instructing unit, when the detector detects the presence of a user, for instructing the card processor to start the operation of the magnetic field generator.

In this arrangement, since the data processing device can stop the magnetic field generator in the absence of a user, the data processing device can suppress its power consumption and reduce a running cost.

In the aspect of the present invention, the data processing device can substantially reliably prevent the magnetic data of the magnetic card from being stolen from the magnetic card and can sufficiently enhance security of the magnetic data.

Other objects, features and advantages of the invention will become apparent from the following description of the embodiments of the invention taken in conjunction with the accompanying drawings.

DESCRIPTION OF THE EMBODIMENTS

Explanation will be made as a card processor in accordance with an embodiment of the present invention.

Figure 1:
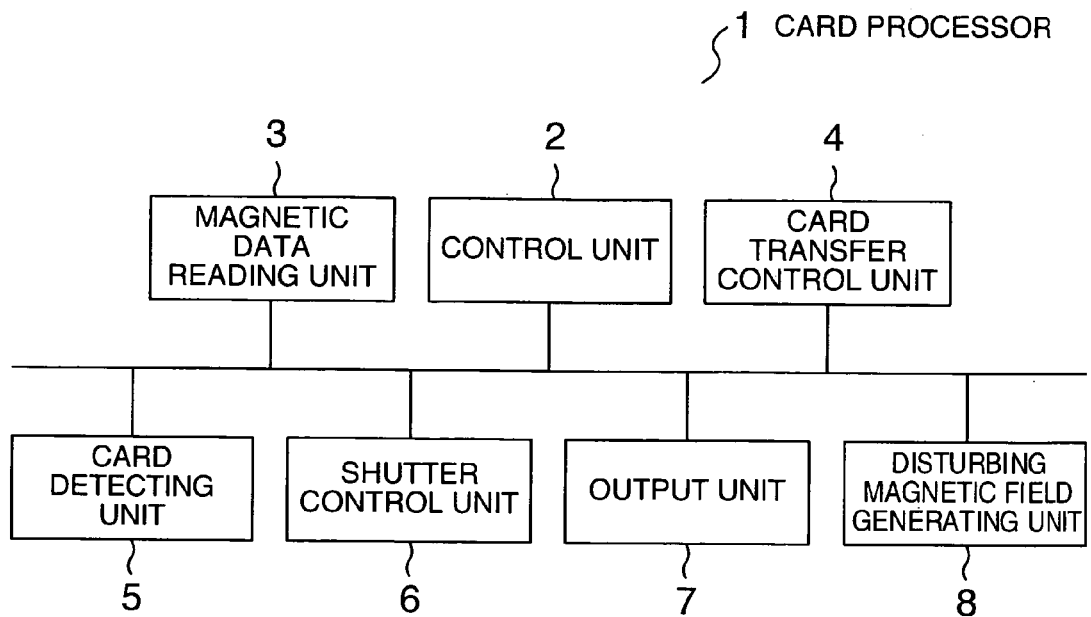
FIG. 1 is a block diagram of an arrangement of a major part of a card processor.

FIG. 1 shows a block diagram of an arrangement of a major part of a card processor 1 in accordance with an embodiment of the present invention. The card processor 1 of the embodiment includes a control unit 2 for controlling the operation of the card processor, a magnetic data reading unit 3 for reading out magnetic data recorded in a magnetic card inserted in the card processor therefrom, a card transfer control unit 4 for controlling the transferring operation of the card inserted in the card processor, a card detecting unit 5 for detecting the presence or absence of the card in the transfer path, a shutter control unit 6 for controlling the opening or closing operation of a shutter provided in the insertion slot, an output unit 7 for issuing magnetic data read out from the card inserted in the card processor, and a disturbing magnetic field generating unit 8 for generating a disturbing magnetic field outside of the insertion slot. The magnetic data reading unit 3 corresponds to the magnetic data reader referred to as in the present invention, whereas, the disturbing magnetic field generating unit 8 corresponds to the magnetic field generator referred to as in the present invention.

Figure 2:
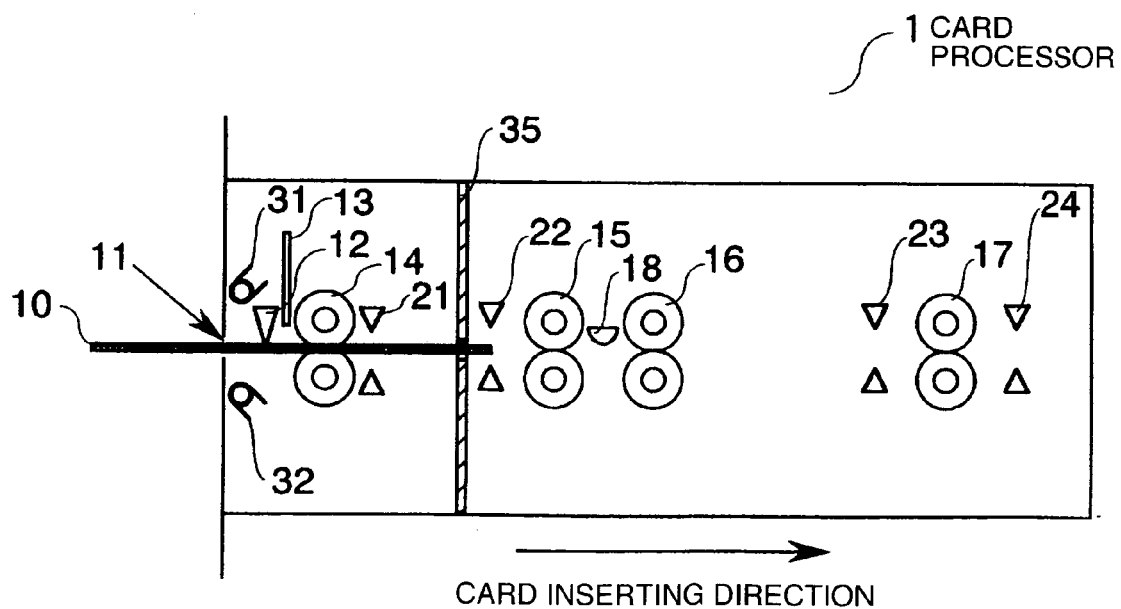
FIG. 2 schematically shows an internal arrangement of the card processor.

FIG. 2 schematically shows an internal arrangement of the card processor in accordance with the embodiment of the present invention. In FIG. 2, reference numeral 10 denotes a magnetic card (which will be referred to merely as the card 10, hereinafter). An insertion slot 11 for insertion of the card 10 is formed in a front side of the card processor 1. An insertion detecting sensor 12 for detecting the card 10 inserted into the insertion slot 11 is provided in the vicinity of the insertion slot 11. The insertion detecting sensor 12, which is a press sensor, is located at such a position as to be pushed by the card 10 inserted from the insertion slot 11. A shutter 13 is located at a position inside of the card processor slightly inner than the insertion detecting sensor 12. The shutter 13 is opened or closed under control of the shutter control unit 6. FIG. 2 shows a state of the card processor when the shutter 13 is opened. In the closed state of the shutter 13, a part of the shutter 13 is opposed to the insertion slot 11 (the shutter 13 is lowered in FIG. 2). The card processor 1 keeps the shutter 13 in its normally-opened state. However, the shutter 13 may be arranged to be closed only when the card 10 is inserted into the interior of the card processor, or to be opened only when the card 10 is inserted and only when the card 10 is discharged. The shutter control unit 6 controls the shutter 13 to be opened or closed according to an instruction from the control unit 2. The card processor 1 may be arranged so as not to provide both the shutter control unit 6 and the shutter 13.

The present embodiment is arranged so that the shutter 13 is usually kept in its opened state and is put in a closed state only when the card 10 is taken in the interior of the card processor.

Pairs of transfer rollers 14 to 17 are arranged in rows along the transfer direction of the card 10. In the card processor 1, such transfer rollers 14 to 17 form a transfer path of the card 10. Ones in the pairs of transfer rollers 14 to 17 are drive rollers to which the rotational force of a motor is transmitted, whereas, the others in the pairs are follower rollers rotated to be followed by the drive rollers. In the illustrated example, the transfer rollers 14 to 17 are driven by a single motor (not shown). The card transfer control unit 4 controls the rotation (including rotational direction and rotational speed) and stoppage of the motor. To feed the card 10 into the interior of the card processor and discharge (return) of the card from the interior thereof. The magnetic data reading unit 3 has a magnetic head 18 which reads out magnetic data recorded in a magnetic stripe of the card 10 being transferred along the transfer path of the transfer rollers 14 to 17. Sensors 21 to 24 for detecting the presence or absence of the card 10 are arranged along the transfer path of the card 10. A spacing interval of the sensors 21 to 24 is shorter than the length of the card 10 in the card transfer direction. The sensors 21 to 24, each of which includes optical sensors as a light emitter and a light receiver, are positioned so that the light emitter is opposed to the light receiver with the transfer path being disposed therebetween. The sensors 21 are used to detect the fact that the card 10 was held between the transfer rollers 14 nearest to the insertion slot 11. The sensors 24 are used to detect the fact that the card 10 inserted into the interior of the card processor reached a deposit part. The sensors 22 and 23 are used to detect the position of the card 10 being transferred along the card transfer path. The card detecting unit 5 detects whether or not the card 10 is inserted in the interior of the card processor and also detects the position of the card 10 in the transfer path on the basis of results detected by the sensors 12, and 21 to 24. An interval in position between the magnetic head 18 and the sensors 24 is slightly longer than the length of the card 10 in the transfer direction. Thus, when the card 10 arrives at the deposit part, that is, when the leading end of the card 10 reaches the position detected by the sensors 24, the magnetic data reading unit 3 already completes its reading operation of magnetic data recorded in the card 10.

Figure 3:
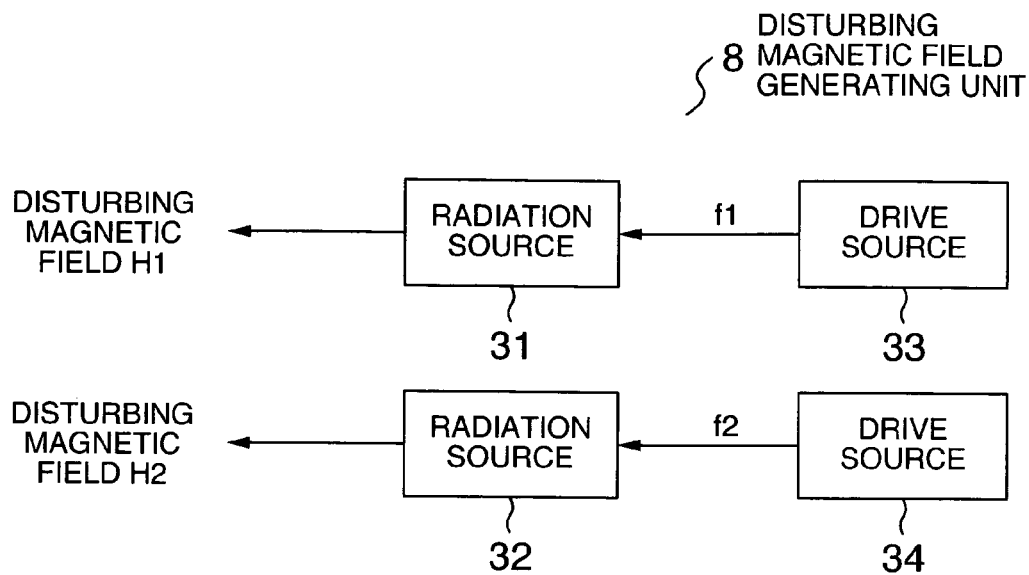
FIG. 3 shows an arrangement of a disturbing magnetic field generator in the card processor.

The disturbing magnetic field generating unit 8 is located in the vicinity of the insertion slot 11. The disturbing magnetic field generating unit 8 has radiation sources 31 and 32. The radiation sources 31 and 32 are positioned to be opposed to each other with the transfer path disposed therebetween. The radiation sources 31 and 32 are also positioned to be opposed to each other with the magnetic stripe of the card 10 disposed therebetween. More specifically, the radiation source 31 is positioned directly above the magnetic stripe of the card 10 inserted in the insertion slot 11, whereas, the radiation source 32 is positioned under the magnetic stripe of the card 10 inserted in the insertion slot 11. As a result, disturbing magnetic fields radiated from the radiation sources 31 and 32 can be generated at such a position that the magnetic stripe of the card 10 inserted in the insertion slot 11 passes. Each of the radiation sources 31 and 32 has a simple structure having a coil wound around an iron core. The disturbing magnetic field generating unit 8 has the drive sources 33 and 34 for supplying currents to the respective coils of the radiation sources 31 and 32 (refer to FIG. 3). A frequency f1 (the frequency f1 of the current flowing through the coil of the radiation source 31) of a drive signal of the drive source 33 for driving the radiation source 31 is different from a frequency f2 (the frequency f2 of the current flowing through the coil of the radiation source 32) of a drive signal of the drive source 34 for driving the radiation source 32. Accordingly, a disturbing magnetic field H1 radiated from the radiation source 31 is different from a disturbing magnetic field H2 radiated from the radiation source 32 in its intensity and frequency. A magnetic shielding member 35 made of a ferrite material or the like having a large permeability is disposed between the insertion slot 11 and the magnetic head 18. The magnetic shielding member 35 is shaped and positioned so as not to block the transfer of the card 10 in the transfer path, as a matter of course. The magnetic shielding member 35 functions to absorb the disturbing magnetic fields H1 and H2 radiated from the radiation sources 31 and 32. Accordingly, the provision of the magnetic shielding member 35 can suppress the influence of the disturbing magnetic fields H1 and H2 radiated from the radiation sources 31 and 32 on the interior of the card processor. As a result, the magnetic head 18 located at a position inner than the magnetic shielding member 35 can read magnetic data while avoiding the influence of the disturbing magnetic fields H1 and H2. The magnetic shielding member 35 corresponds to a suppresser referred to as herein.

Figure 4:
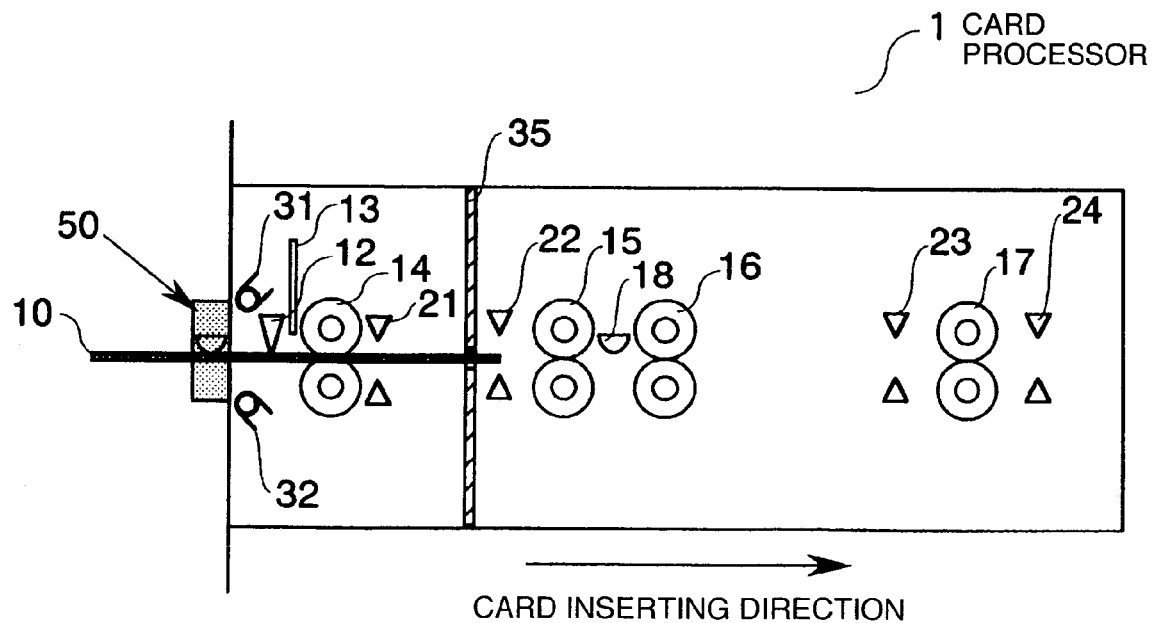
FIG. 4 shows a state of the card processor having a skimming device mounted therein.
Figure 5:
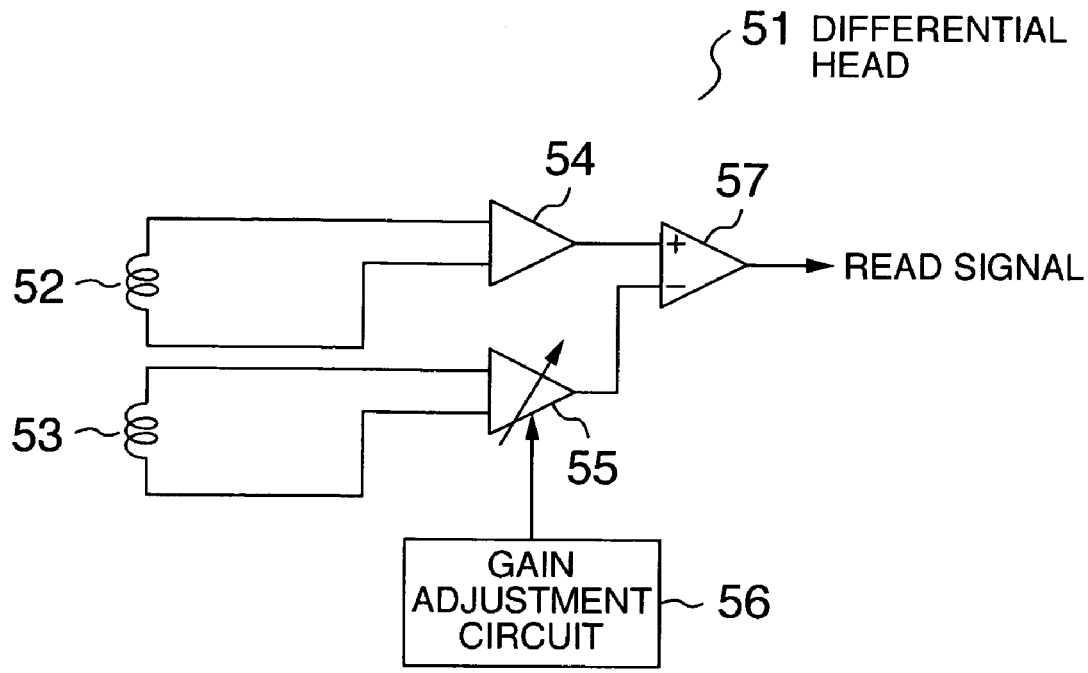
FIG. 5 shows a structure of a differential head.

Brief explanation will now be made as to a skimming device intended to steal the magnetic data recorded in the card 10. A skimming device 50 is mounted on a front side of the insertion slot 11 as shown in FIG. 4. When the skimming device 50 is mounted, the card 10 is passed through the skimming device 50 and then fed from the insertion slot 11 into the interior of the card processor. The skimming device 50 is provided with a reading unit having a magnetic head for illegally reading the magnetic data recorded in the card 10, a memory for storing the magnetic data illegally read, and wireless communication unit for wirelessly issuing the magnetic data stored in the memory. Explanation will next be made in connection with a case where the magnetic head in the reading unit of the skimming device 50 is such a differential head 51 as shown in FIG. 5. The differential head 51, as shown in FIG. 5, has a read head 52 for reading the magnetic data recorded in the magnetic stripe of the card 10 by contacting with the magnetic stripe, and a dummy head 53 located in the vicinity of the read head 52. The differential head also has a first amplifier 54 for amplifying an output of the read head 52, a second amplifier 55 for amplifying an output of the dummy head 53, a gain adjustment circuit 56 for adjusting a gain of the second amplifier 55, and a differential circuit 57 for issuing a difference between outputs of the first and second amplifiers 54 and 55. The read head 52 has substantially the same electric characteristic as the dummy head 53.

The differential head 51 is developed as a magnetic head which can read magnetic data without avoiding the influence of an external magnetic field. When the magnetic data is read out by the differential head 51, the output of the read head 52 contacted with the magnetic stripe corresponds to a superimposition of an electromotive force based on the magnetic data and an electromotive force based on the external magnetic field (peripheral magnetic field). The output of the dummy head 53 not contacted with the magnetic stripe corresponds to a signal for an electromotive force based on the external magnetic field (peripheral magnetic field). Accordingly, theoretically, by finding a difference between the output of the dummy head 53 and the output of the first amplifier 54, a read signal immune to the influence of the external magnetic field can be obtained. Practically, however, the electric characteristic of the read head 52 is not completely the same as that of the dummy head 53 due to variations among used parts. In addition, it is physically impossible to locate the read head 52 and the dummy head 53 at the same position, so that the read head 52 and the dummy head 53 will not receive completely the same external magnetic field. For this reason, such an arrangement is employed. That is, the difference (output of the differential circuit 57) between the output of the read head 52 and the output of the dummy head 53 is not output merely as a read signal, but the aforementioned first and second amplifiers 54 and 55 are provided, and the gain of the second amplifier 55 is adjusted by the gain adjustment circuit 56. In such a state that the magnetic data is not read yet with use of the differential head 51, the gain of the second amplifier 55 is adjusted so that a difference between the output of the read head 52 and the output of the dummy head 53 becomes nearly zero.

Explanation will next be made as to the operation of the card processor 1 of the present embodiment. In the card processor 1 of the embodiment, when the card processor is operated, the disturbing magnetic field generating unit 8 always radiates disturbing magnetic fields from the radiation sources 31 and 32. The radiation source 31 generates the disturbing magnetic field H1 based on the current of the frequency f1 flowing through the coil by the drive source 33, whereas, the radiation source 32 generates the disturbing magnetic field H2 based on the current of the frequency f2 flowing through the coil by the drive source 34.

Figure 6:
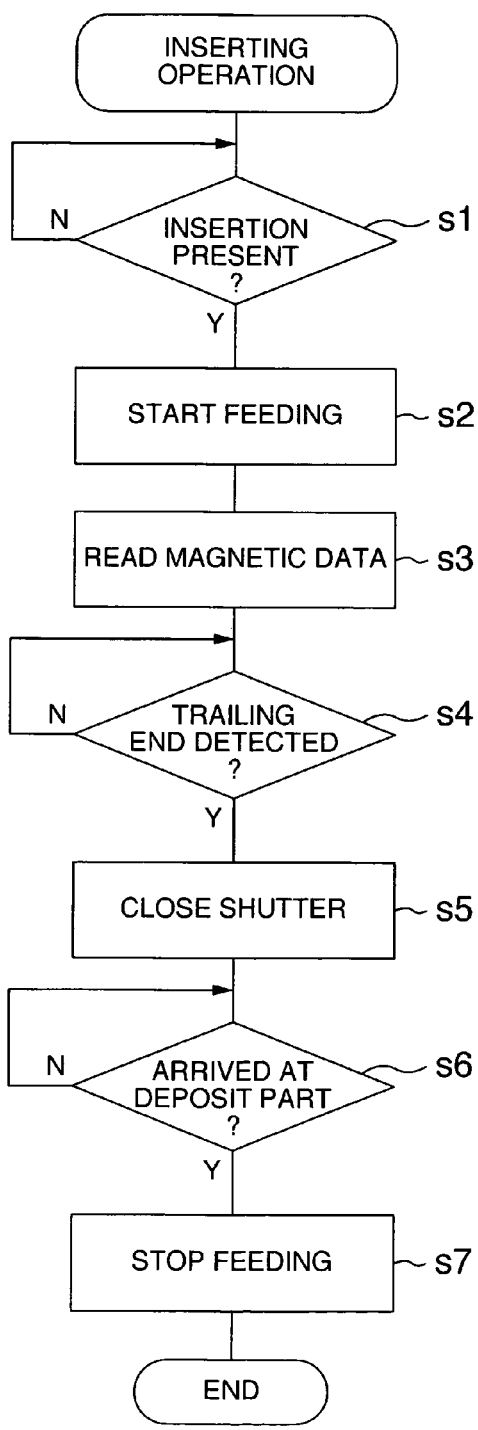
FIG. 6 is a flow chart showing card inserting operations of the card processor.

Explanation will first be made as to the operation (card inserting operation) of the card processor when the card 10 inserted from the insertion slot 11 is fed into the interior of the card processor. FIG. 6 is a flow chart showing the card inserting operation. The card processor 1 is in an initial state where the card 10 is not detected yet by the card detecting unit 5. At this time, the shutter 13 is put in its opened state. As has been explained above, the disturbing magnetic field generating unit 8 radiates the disturbing magnetic fields from the radiation sources 31 and 32. When the card 10 is detected by the insertion detecting sensor 12, the card processor 1 determines that the card 10 was inserted (step s1). When determining in the step s1 that the card 10 was inserted, the card processor 1 starts rotating the transfer rollers 14 to 17 (step s2). In the step s2, the transfer rollers 14 to 17 are rotated in such a direction (referred to as the positive direction, hereinafter) as to feed the inserted card 10 into the interior of the card processor. At this time, since the shutter 13 is put in its opened state, the insertion of the card 10 by the user will not be blocked. Thereafter, in the card processor 1, the inserted card 10 is transferred by the card transfer control unit 4 up to the deposit part at a constant speed.

In the card processor 1, when the card 10 is transferred to the deposit part, the magnetic head 18 is brought into contact with the magnetic stripe of the card 10 and reads magnetic data recorded in the card 10 (step s3). Even when the magnetic data reading unit 3 is reading the magnetic data recorded in the card 10, the disturbing magnetic field generating unit 8 radiates disturbing magnetic fields from the radiation sources 31 and 32. As has been mentioned above, the magnetic shielding member 35 is disposed between the radiation sources 31 and 32 and the magnetic head 18. With such an arrangement, the magnetic data reading unit 3 can read the magnetic data recorded in the card 10 while substantially avoiding the influence of the disturbing magnetic fields radiated from the radiation sources 31 and 32.

In the card processor 1, as the card 10 is fed to the deposit part, the trailing end of the card 10 is detected by the sensors 21 positioned next to the transfer rollers 14 (on the side of the rollers opposite to the insertion slot 11) (step s4), the shutter 13 is closed under control of the shutter control unit 6 (step s5). In the step s4, when the sensors 21 are changed from a state where the card 10 was detected to a state where the card 10 is not detected, the card processor determines that the trailing edge of the card 10 was detected. Since the shutter 13 is closed at the step s5, another card 10 can be prevented from being inserted through the insertion slot 11.

When the card 10 reaches the deposit part (step s6), the card processor 1 stops rotating the transfer rollers 14 to 17 under control of the card transfer control unit 4 (step s7). In the step s6, when the sensors 24 detect the card 10, the card processor determines that the card 10 arrived at the deposit part. With regard to reading of the magnetic data by the magnetic data reading unit 3, the magnetic data reading is already completed at the time point when the card 10 reached the deposit part.

Explanation will next be made as to the operation (card returning operation) of the card processor when the card 10 stayed in the deposit part through the aforementioned card inserting operation is returned to the user. FIG. 6 is a flow chart showing the card returning operation. The card processor starts rotating the transfer rollers 14 to 17 (step s11). In the step s11, the transfer rollers 14 to 17 are rotated in such a direction as to transfer the card 10 from the deposit part to the insertion slot 11 (which direction will be referred to as the reverse direction, hereinafter). The card 10 is fed to the insertion slot 11 at a constant speed. Even at this time, the disturbing magnetic field generating unit 8 radiates disturbing magnetic fields from the radiation sources 31 and 32. When the leading end of the card 10 is detected by the sensors 21 disposed next to the transfer rollers 14 (on the side of the rollers opposite to the insertion slot 11) (step s12), the shutter 13 is opened. When the card processor 1 is changed from such a state that the card is not detected yet by the sensors 21 to such a state that the card 10 is detected at the step s12, the card processor 1 determines that the leading end of the card 10 was detected by the sensors 21.

Explanation will now be made as to the leading and trailing ends of the card 10 on the basis of the transfer direction of the card 10. The trailing end of the card 10 upon the above card inserting operation corresponds to the leading end of the card 10 upon the card returning operation.

Thereafter, when the trailing end of the card 10 is detected by the sensors 21 (step s14), the card processor 1 stops rotating the transfer rollers 14 to 17 being rotated in the reverse direction under control of the card transfer control unit 4 (step s15). In the step s14, when the state where the card is detected by the sensors 21 is changed to the state where the card 10 is not detected, the card processor 1 determines that the trailing end of the card 10 was detected by the sensors 21. The stoppage of the transfer rollers 14 to 17 also causes stoppage of transfer of the card 10. At this time, the card 10 is held between the transfer rollers 14 and the leading end part of the card is projected outwardly of the insertion slot 11. Thus the user can hold the leading end part of the card 10 with his fingers and draw out the card. When the state where the card 10 is detected by the insertion detecting sensor 12 is changed to the state where the card is not detected (step s16), the card processor 1 determines that the card 10 was already drawn by the user and terminates its operation.

Explanation will then be made in connection with a case where the skimming device 50 using the differential head 51 as shown in FIG. 5 is mounted on the front side of the insertion slot. As has been explained above, during the operation of the card processor 1, the disturbing magnetic field generating unit 8 always radiates disturbing magnetic fields from the radiation sources 31 and 32. Since the skimming device 50 is mounted on the front side of the insertion slot 11, the card processor is influenced by the disturbing magnetic fields (a combined magnetic field of these magnetic fields) radiated from the radiation sources 31 and 32 during reading of the magnetic data recorded in the card 10. For this reason, when the magnetic head provided in the skimming device 50 is not the differential head but a usual magnetic head, an electromotive force based on the disturbing magnetic fields is superimposed on a read signal read by the magnetic head. Thus the magnetic head cannot read the correct magnetic data from the card 10.

Figure 8:
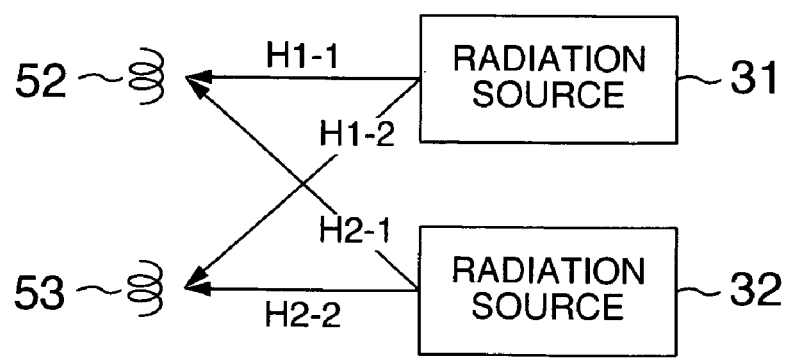
FIG. 8 is a diagram for explaining disturbing magnetic fields which affect the differential head.

When the magnetic head provided in the skimming device 50 is such a differential head 51 as shown in FIG. 5, it is required to previously adjust an output balance between the read head 52 and the dummy head 53. In other words, in such a state that the magnetic data is not read out yet, it is required to adjust the gain of the second amplifier 55 under control of the gain adjustment circuit 56 in such a manner that the output of the differential circuit 57 becomes substantially zero. However, as shown in FIG. 8, at such a position that the differential head 51 of the skimming device 50 is located, the differential head 51 is irradiated with the disturbing magnetic field H1 radiated from the radiation source 31 and with the disturbing magnetic field H2 radiated from the radiation source 32 in different directions. The disturbing magnetic field H1 and the disturbing magnetic field H2 have different frequencies and different intensities.

It is therein assumed that the influence of the disturbing magnetic field H1 radiated from the radiation source 31 on the read head 52 is denoted by H1-1, the influence thereof on the dummy head 53 is denoted by H1-2, the influence of the disturbing magnetic field H2 on the read head 52 is denoted by H2-1, and the influence thereof on the dummy head 53 is denoted by H2-2. Since the read head 52 and the dummy head 53 are not completely the same in their electric characteristic and disposition location, H1-1≠H1-2, and H2-1≠H2-2.

As has been explained above, since the disturbing magnetic field H1 and the disturbing magnetic field H2 have different frequencies and different intensities, H1-1:H1-2≠H2-1:H2-2.

For this reason, it is impossible, in such a state that the magnetic data is not read out yet, to adjust the gain of the second amplifier 55 under control of the gain adjustment circuit 56 in such a manner that the output of the differential circuit 57 becomes substantially zero. Briefly speaking, even when the gain of the second amplifier 55 is adjusted under control of the gain adjustment circuit 56 so as to acquire a read signal for the magnetic data with the influence of the disturbing magnetic field H1 removed, the output of the differential circuit 57 is affected by the influence of the disturbing magnetic field H2. On the contrary, even when the gain of the second amplifier 55 is adjusted under control of the gain adjustment circuit 56 so as to acquire a read signal for the magnetic data with the influence of the disturbing magnetic field H2 removed, the output of the differential circuit 57 is affected by the influence of the disturbing magnetic field H1. Accordingly, even when the skimming device 50 using the differential head 51 is employed, it is impossible to acquire a read signal for the magnetic data with the influence of the disturbing magnetic field H1 and the disturbing magnetic field H2 removed.

In this way, even when the skimming device 50 using the differential head 51 is mounted to the card processor, the card processor 1 of the present embodiment can prevent the magnetic data of the card 10 from being illegally read out from the card. Accordingly, the card processor of the embodiment can sufficiently enhance security against the stealing of the magnetic data recorded in the card 10 by the skimming device 50.

Though explanation has been made in connection with the example where the two radiation sources 31 and 32 are provided in the vicinity of the insertion slot 11 in the above embodiment, 3 or more radiation sources may be provided as necessary. In the latter case, the drive signal for the drive source provided for each radiation source may have 2 or more kinds of frequencies. However, it is more desirable to provide different frequencies for the respective drive signals of the drive sources.

With respect to the frequencies of the disturbing magnetic fields H1 and H2 radiated from the radiation sources 31 and 32, it is preferable to set such disturbing-field frequencies at values close to the frequency of the read signal in such a manner that such disturbing-field frequencies interfere with the read signal of the magnetic data. The frequency of the read signal is determined by the recording density of the magnetic data in the magnetic stripe and by the transfer speed of the card 10.

In the foregoing embodiment, the amplitude of the drive signal of the drive source 33 for driving the radiation source 31 may be the same as or different from the amplitude of the drive signal of the drive source 34 for driving the radiation source 32.

In the foregoing embodiment, explanation has been made in connection with the case where the frequency f1 of the drive signal of the drive source 33 for driving the radiation source 31 is different from the frequency f2 of the drive signal of the drive source 34 for driving the radiation source 32. However, the frequencies of these drive signals may be the same by changing with time a ratio between the amplitude of the drive signal of the drive source 33 for driving the radiation source 31 and the amplitude of the drive signal of the drive source 34 for driving the radiation source 32. More specifically, this can be attained by making the phase of the drive signal of the drive source 33 for driving the radiation source 31 different from the phase of the drive signal of the drive source 34 for driving the radiation source 32. In this case, the amplitude of the drive signal of the drive source 33 for driving the radiation source 31 may also be made different from the amplitude of the drive signal of the drive source 34 for driving the radiation source 32.

Figure 9:
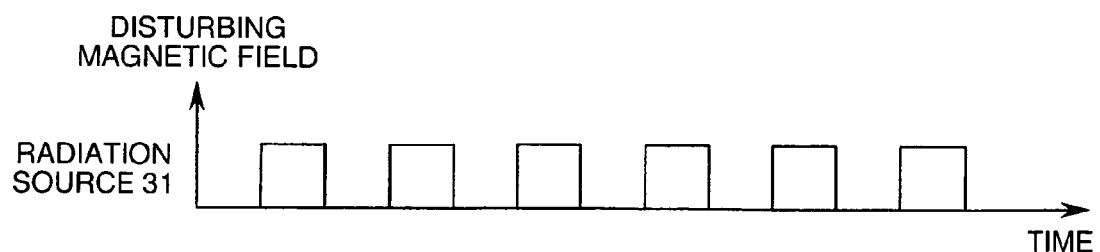
FIG. 9 is a diagram for explaining the timing of generating a disturbing magnetic field in the card processor.

In the above embodiment, explanation has been made in connection with the case where the disturbing magnetic fields H1 and H2 are always radiated from the radiation sources 31 and 32 in the disturbing magnetic field generating unit 8. However, such an arrangement may be employed that, when the disturbing magnetic field H1 is radiated from the radiation source 31, the card processor stops the radiation of the disturbing magnetic field H2 from the radiation source 32, whereas, when the disturbing magnetic field H2 is radiated from the radiation source 32, the card processor stops the radiation of the disturbing magnetic field H1 from the radiation source 31, as shown in FIG. 9. A time during which the radiation source 31 radiates the disturbing magnetic field H1 may be the same as a time during which the radiation source 31 stops radiating the disturbing magnetic field H1 as shown in FIG. 9, or may be made different therefrom. A time interval of switching between the radiation sources 31 and 32 is set to be about one tenths to about a fraction of a time necessary for reading the magnetic data recorded in the card 10, or is set to be tens of ms to hundreds of ms. In this arrangement, the disturbing magnetic field to the skimming device 50 may be changed with time. This also causes the skimming device 50 to be alternately influenced by the disturbing magnetic field H1 and by the disturbing magnetic field H2. Thus, even when the differential head 51 is employed, this eventually results in that the magnetic data of the card 10 cannot be illegally stolen. Accordingly, the magnetic data can be protected with sufficiently high security. Further, such an arrangement is employed that the radiation of the disturbing magnetic field from the other radiation source is stopped during the radiation of the disturbing magnetic field from one radiation source. Thus, the card processor can suppress its power consumption and eventually can suppress a running cost.

Figure 10:
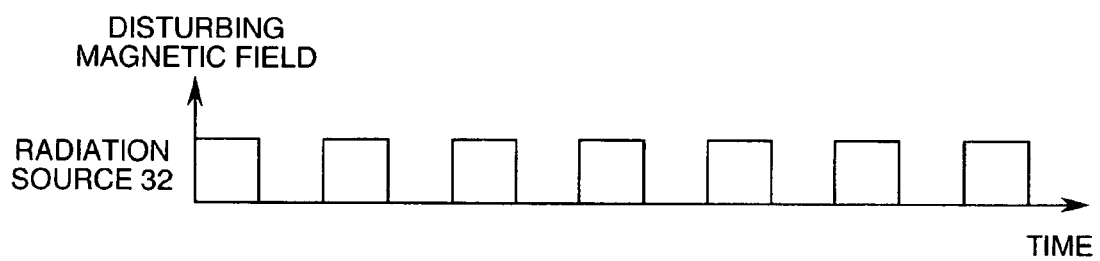
FIG. 10 is a diagram for explaining a change in the disturbing magnetic field in the card processor.
Figure 10:
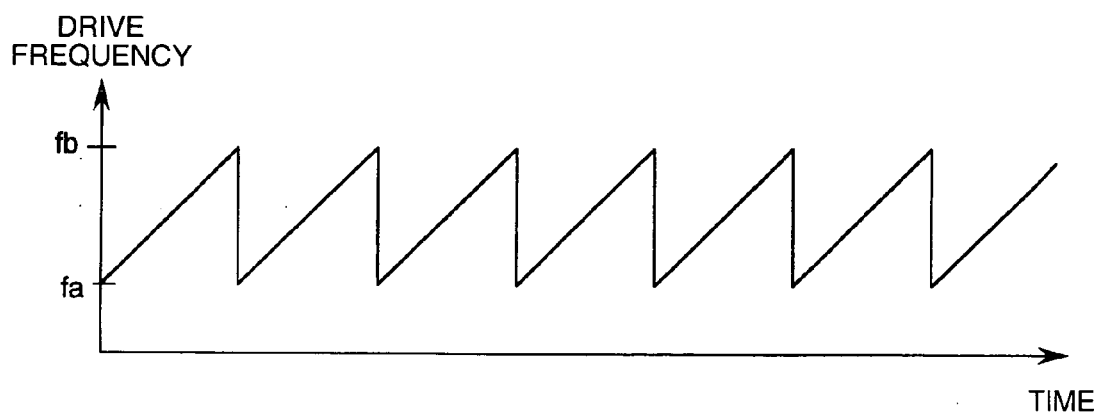

Further, such an arrangement may be employed that the frequency of a current flowing from the drive source 33 through the coil of the radiation source 31 is varied continuously or intermittently with time. For example, an arrangement of changing the frequency of the current flowing from the drive source 33 through the coil of the radiation source 31 continuously with time may be employed by sweeping the frequency of the drive signal of the drive source 33 in a range of fa to fb as shown in FIG. 10. In this case, the disturbing magnetic field H1 radiated from the radiation source 31 is varied continuously with time. For this reason, even when the skimming device 50 is mounted on the front side of the insertion slot 11, the skimming device 50 is influenced by the continuously-varying disturbing magnetic field H1 radiated from the radiation source 31. Thus, even when the differential head 51 is employed in the skimming device 50, the disturbing magnetic field H1 varies continuously with time. As a result, the gain adjustment circuit 56 cannot adjust the gain of the second amplifier 55 in such a manner that the output of the differential circuit 57 becomes substantially zero in such a state that the magnetic data is not read out yet.

In this way, the card processor 1 of the present embodiment can avoid illegal reading of the magnetic data recorded in the card 10 even when the skimming device using the differential head is mounted on the card processor. Accordingly, sufficient security of the magnetic data can be achieved.

Figure 11A:
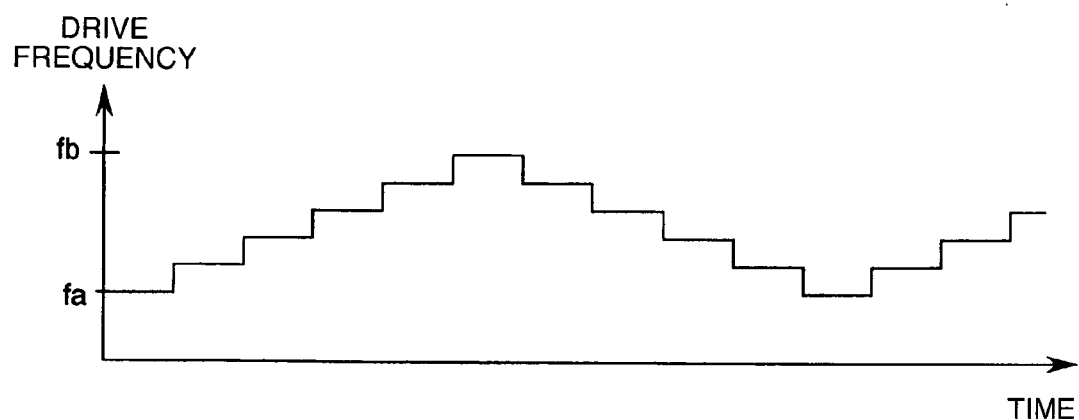
FIGS. 11A and 11B are diagrams for explaining changes in disturbing magnetic fields in another card processor respectively.
Figure 11B:
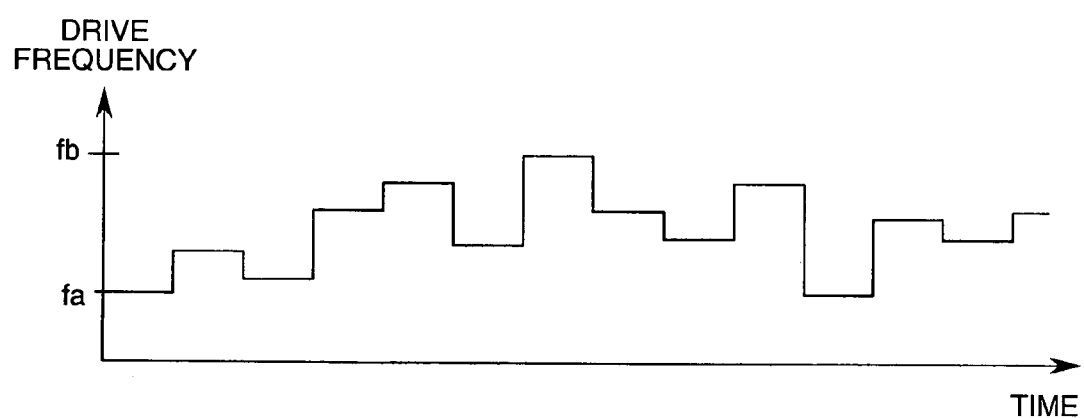

The above explanation has been made in connection with the case where the frequency of the drive signal of the drive source 33 is swept in the range of fa to fb. However, the frequency of the drive signal may be stepwise varied in the range of fa to fb as shown in FIG. 11A, or the frequency of the drive signal may be randomly varied in the range of fa to fb as shown in FIG. 11B.

Although only the frequency of the drive signal of the drive source 33 has been varied therein, the frequency of the drive signal of the drive source 34 may also be varied simultaneously with the variation of the drive signal frequency of the drive source 33.

In the foregoing embodiment, when the card 10 is not inserted in the interior of the card processor, the shutter 13 has been put in the opened state. However, the shutter may also be put in the closed state. In the latter case, it is only required to add the operation of opening the shutter 13 when the card processor determines that the card 10 was inserted in the step s1 of FIG. 6. When the card processor determines that the user extracted the card 10 from the card processor in the step s16 of FIG. 7, it is only required to add the operation of closing the shutter 13. In this manner, the card processor can prevent dust or the like from being invaded from the insertion slot 11 into the interior of the card processor.

In this embodiment, explanation has been made in connection with the case where magnetic data is recorded in the magnetic stripe formed on the surface of the card 10 as an example. However, such a hybrid card that an IC chip having magnetic data recorded therein is provided in addition to the magnetic stripe may be employed as the card 10. In this case, it is only required to provide a contact in the interior of the card processor 1 to be electrically connected with the IC chip of the card 10 fed in the deposit part to read out the magnetic data recorded in the IC chip.

Figure 12A:
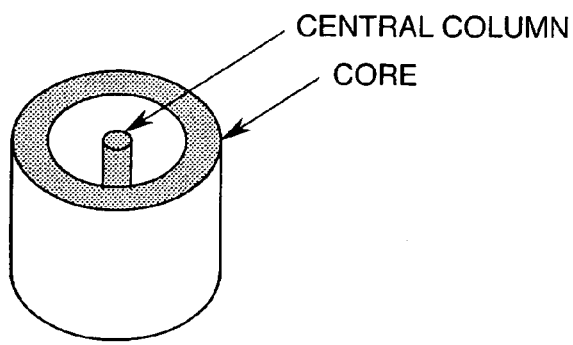
FIGS. 12A, 12B, and 12C show diagrams for explaining the structure of the other card processor when employing a pot type coil.
Figure 12B:
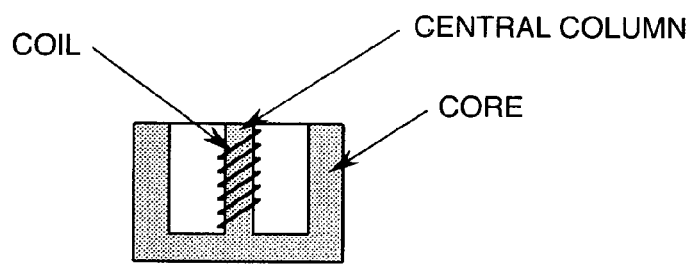
Figure 12C:
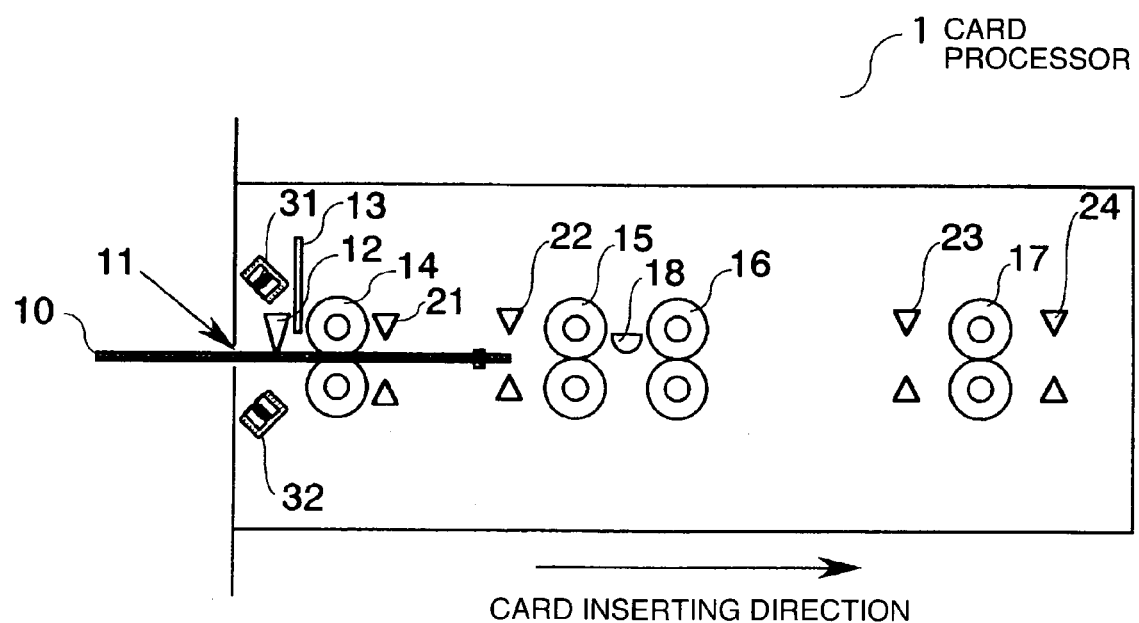

In the above embodiment, in order for the magnetic data reading unit 3 to read the magnetic data recorded in the card 10 while substantially avoiding the influence of the disturbing magnetic fields radiated from the radiation sources 31 and 32, the magnetic shielding member 35 has been disposed between the radiation sources 31 and 32 and the magnetic head 18. However, the radiation sources 31 and 32 may be made up of such a pot type coil as shown in FIGS. 12A and 12B, and the pot type coil may be disposed as shown in FIG. 12C. FIG. 12A is a perspective view of the pot type coil, and FIG. 12B is a cross-sectional view of the pot type coil. The core of the pot type coil is made of a material such as ferrite having a large permeability. The core has such an outer shape as shown in FIGS. 12a and 12b. More specifically, the core has a shape of a cylinder opened in its one end face and is not opened in the other end face. As shown in FIG. 12C, the pot type coil is mounted with the opened end surface directed to the insertion slot 11. A central column having a coil wound therearound is provided nearly in the center of the core. In the pot type coil, a magnetic field radiated from the open end face exerts substantially no influence upon the rear side of the not-opened end fact of the pot type coil. Accordingly, the magnetic data reading unit 3 can read the magnetic data recorded in the card 10 while substantially avoiding the influence of the disturbing magnetic field radiated from the radiation sources 31 and 32.

Figure 13:
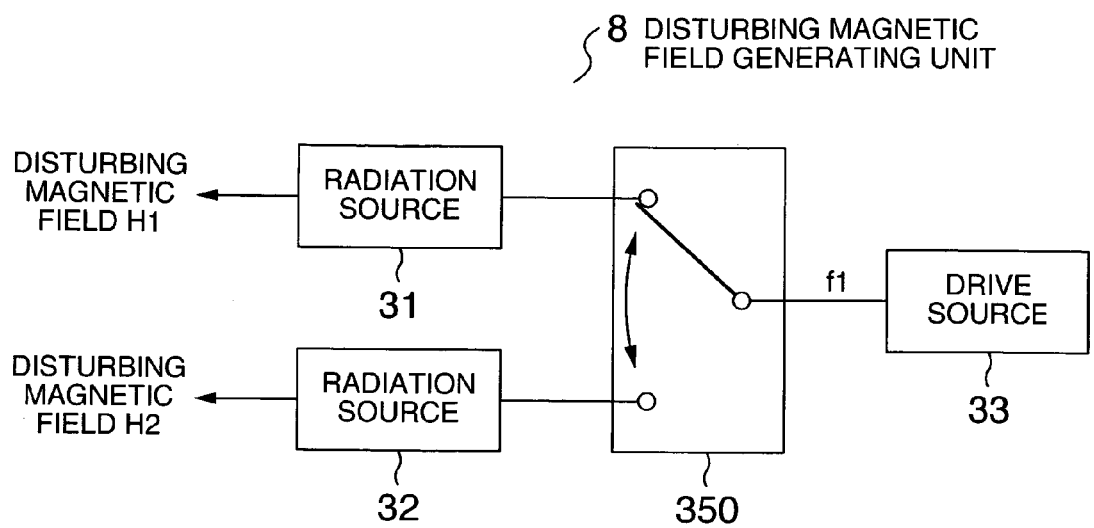
FIG. 13 shows an arrangement of a disturbing magnetic field generator in the other card processor.

Explanation will next be made as to another embodiment of the present invention. The card processor 1 of the other embodiment has substantially the same arrangement as the card processor of the foregoing embodiment, but is different therefrom in the structure of the disturbing magnetic field generating unit 8. The disturbing magnetic field generating unit 8 in the present embodiment has such an arrangement as shown in FIG. 13. More specifically, the disturbing magnetic field generating unit 8 has the same arrangement as the foregoing embodiment, but is different therefrom in that the single drive source 33 for driving the radiation sources 31 and 32 is provided and that a switching unit 350 for selectively switching between the radiation sources 31 and 32 to be driven by the drive source 33. The switching unit 350 switches between the radiation sources 31 and 32 to be driven by the drive source 33 at predetermined timing. For example, switching between the radiation sources 31 and 32 to be driven by the drive source 33 is carried out at intervals of a constant time such as tens of ms to hundred and tens of ms. The drive signal of the radiation source 31 has a frequency of f1. The two radiation sources 31 and 32 are located at positions similar to in the above embodiment.

Figure 7:
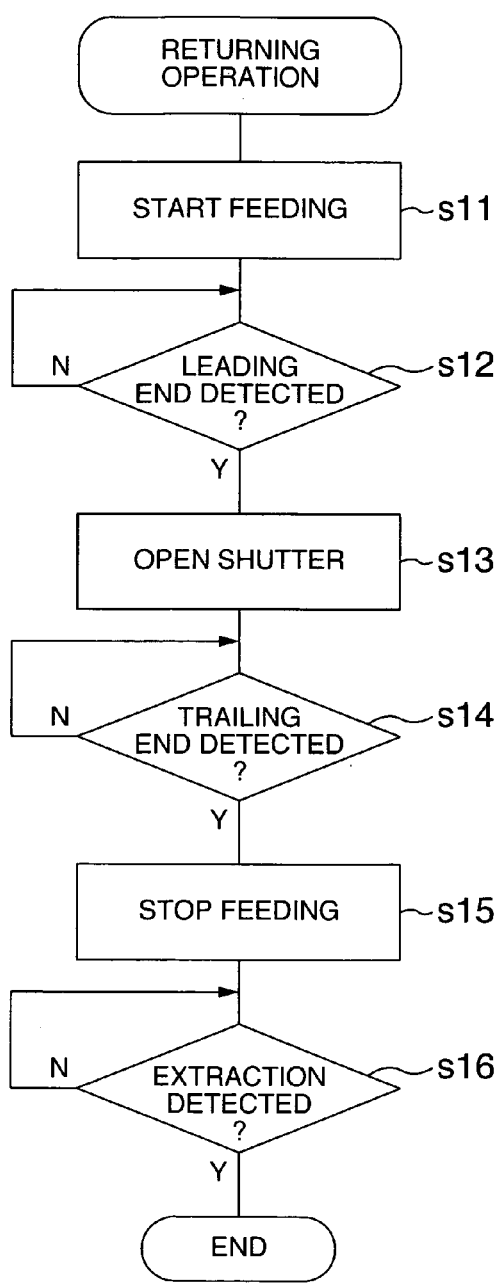
FIG. 7 is a flow chart showing card returning operations of the card processor.

The inserting and returning operations of the card 10 in the card processor 1 of the present embodiment are the same as those explained in FIGS. 6 and 7, and thus explanation thereof is omitted.

In the card processor 1 of the present embodiment, during the operation of the card processor, the disturbing magnetic field generating unit 8 radiates the disturbing magnetic field while switching between the radiation sources 31 and 32. For this reason, even when the skimming device 50 is mounted on the front side of the insertion slot 11, the skimming device 50 is influenced alternately by the disturbing magnetic field H1 radiated from the radiation source 31 and by the disturbing magnetic field H2 radiated from the radiation source 32. Since the radiation sources 31 and 32 are located at different positions, the skimming device 50 is influenced differently by the disturbing magnetic fields H1 and H2. It is assumed as in the foregoing embodiment that the influence of the disturbing magnetic field H1 radiated from the radiation source 31 on the read head 52 is denoted by H1-1, the influence thereof on the dummy head 53 is denoted by H1-2, the influence of the disturbing magnetic field H1 radiated from the radiation source 32 on the read head 52 is denoted by H2-1, and the influence thereof on the dummy head 53 is denoted by H2-2. Since the read head 52 and the dummy head 53 are not exactly the same in electric characteristic and disposition, H1-1≠H1-2, and H2-1≠H2-2. As has been mentioned above, since the two radiation sources 31 and 32 are located at different positions, H1-1:H1-2≠H2-1:H2-2. For this reason, as in the foregoing embodiment, it is impossible to adjust the gain of the second amplifier 55 under control of the gain adjustment circuit 56 in such a manner that the output of the differential circuit 57 becomes nearly zero.

In this way, in the card processor 1 of the present embodiment, the skimming device 50 is influenced alternately by the disturbing magnetic field H1 and by the disturbing magnetic field H2. Thus, even when the differential head 51 is employed, the magnetic data recorded in the card 10 can be eventually prevented from being illegally read out therefrom. As a result, sufficient security of the magnetic data can be achieved. Since the radiation source 32 in the foregoing embodiment is replaced by the switching unit 350 as a circuit simpler than the radiation source 32, the card processor can reduce its manufacturing cost.

Although the drive signal of the drive source 33 has a frequency of frequency f1 in the present embodiment, such an arrangement may be employed that the frequency of the drive signal of the drive source 33 is switched over in association with the switching between the radiation sources 31 and 32 by the switching unit 350. For example, the frequency of the drive signal of the drive source 33 is changed to f1 when the drive source 33 is switched to the radiation source 31 which radiates the disturbing magnetic field by the switching unit 350; whereas the frequency of the drive signal of the drive source 33 is changed to f2 when the drive source 33 is switched to the radiation source 32 which radiates the disturbing magnetic field by the switching unit 350. With such an arrangement, a difference between the disturbing magnetic fields H1 and H2 can be made larger, and therefore higher security of the magnetic data can be attained.

Such an arrangement may also be employed that the frequency of the drive signal of the drive source 33 is changed without being linked to the switching between the radiation sources 31 and 32 by the switching unit 350.

Figure 14:
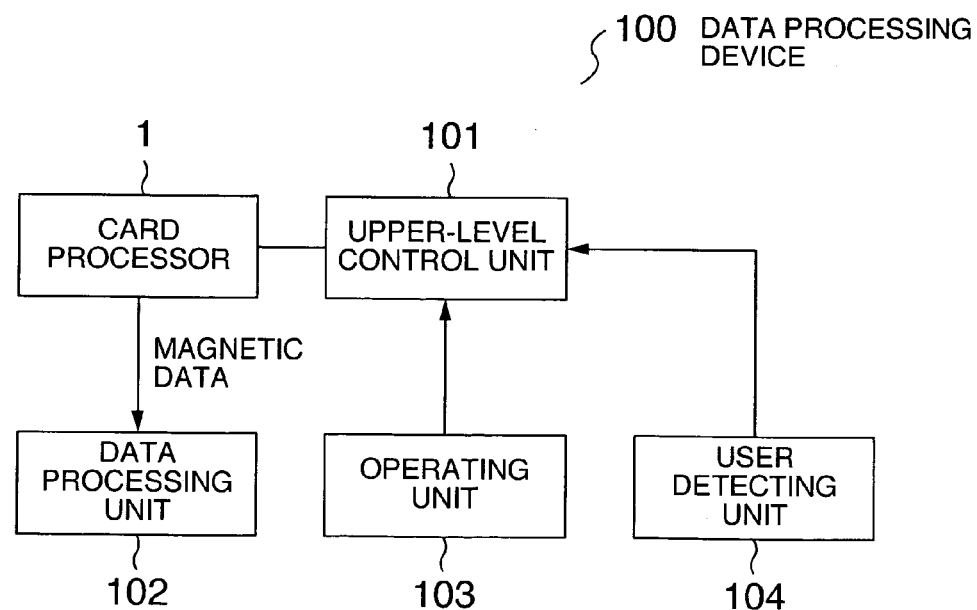
FIG. 14 is a block diagram of an arrangement of a data processing device having the other card processor built therein.

Explanation will next be made as to a data processing device 100 having the card processor as any one of the foregoing embodiments built therein. The data processing device 100 is, for example, an ATM, a CD, or a CAT. FIG. 14 is a block diagram of arrangement of a major part of the data processing device. The data processing device 100 of the present embodiment includes the card processor 1 as any one of the foregoing embodiments, a data processing unit 102 for performing data processing operation with use of the magnetic data read out from the card 10 by the card processor 1, an operating unit 103 for performing input operation to the card processor, and a user detecting unit 104 for detecting a user. An upper-level control unit 101 in the drawing controls the entire operation of the data processing device. The card processor 1 outputs the magnetic data read out from the card 10, from the output unit 7. The data processing unit 102 receives the magnetic data issued from the output unit 7 and performs data processing operation with use of the read magnetic data. The data processing operation relates, for example, to account transaction or credit transaction. The operating unit 103 has an indicator for displaying an operating guide or the like for the user. The user detecting unit 104 is arranged to detect the user through an infrared sensor or the like.

The card processor 1 built in the data processing device 100 of the present embodiment switches between the radiation and stoppage of the disturbing magnetic field according to an instruction from the data processing device 100. The data processing device 100 instructs the card processor 1 to radiate the disturbing magnetic field during detection of the user in the user detecting unit 104, and instructs the card processor 1 to radiate the disturbing magnetic field during no detection of the user. In the data processing device 100 of the present embodiment, accordingly, in the presence of the user, that is, when the card 10 is loaded in the card processor 1, the card processor 1 generates the disturbing magnetic field from the disturbing magnetic field generating unit 8. In other words, when the card 10 is not loaded in the card processor 1, the card processor 1 generates no disturbing magnetic field from the disturbing magnetic field generating unit 8.

Therefore, the data processing device can sufficiently reduce its running cost while avoiding wasteful generation of the disturbing magnetic field in the card processor 1. As has been explained above, even when the skimming device for the card processor 1 employs the differential head, the skimming device cannot illegally read the magnetic data recorded in the card 10. Thus high security of the magnetic data can be attained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A card processor comprising:
 a magnetic data reader which reads magnetic data recorded in a magnetic card transferred along a card transfer path with use of a magnetic head provided in the midway of the transfer path; and
 a magnetic field generator which generates a magnetic field outside of an insertion slot of the transfer path,
 wherein the magnetic field generator has a plurality of radiation sources for radiating the magnetic field outside of the insertion slot of the transfer path and a plurality of drive sources provided for respective radiation sources, and
 two specific drive sources in the plurality of drive sources have different frequencies of drive signals for driving the radiation sources.

2. A card processor according to claim 1, wherein the magnetic field generator functions to switch between drive and stoppage of each of the drive sources at predetermined timing.

3. A card processor according to claim 1, wherein the magnetic field generator functions to vary the amplitude of the drive signal of the radiation source for driving each of the drive sources at predetermined timing.

4. A card processor according to claim 1, wherein a specific drive source in the plurality of drive sources causes the corresponding radiation source to vary the magnetic field radiated outside of the insertion slot of the transfer path with time.

5. A card processor according to claim 4, wherein the specific drive source sweeps the frequency of the drive signal for driving the drive source to cause the corresponding radiation source to change, with time, the magnetic field radiated outside of the insertion slot of the transfer path.

6. A card processor according to claim 4, wherein the specific drive source is made to change the frequency of the drive signal for driving the radiation source continuously or intermittently with time to change, with time, the magnetic field radiated outside of the insertion slot of the transfer path by the corresponding radiation source.

7. A card processor according to claim 1, wherein the magnetic field generator has a switching unit for switching between the radiation sources driven by the drive sources.

8. A card processor according to claim 7, wherein the drive source functions to change the frequency of the drive signal for driving the radiation source at predetermined timing.

9. A card processor according to claim 7, wherein the drive source changes the frequency of the drive signal for driving the radiation sources at the timing when the switching unit switches between the radiation sources.

10. A card processor according to claim 1, further comprising a suppressor for suppressing the influences of the magnetic field generated by the magnetic field generator on the magnetic head of the magnetic data reader.

* * * * *